United States Patent [19]

Dryga et al.

[11] Patent Number: 4,940,336

[45] Date of Patent: Jul. 10, 1990

[54] UNBALANCE VIBRATOR

[76] Inventors: Alexandr I. Dryga, ulitsa Marata, 6, kv. 64; Alexandr G. Eskov, ulitsa Katerinicha, i6, kv. 42, both of Kramatorsk, U.S.S.R.

[21] Appl. No.: 357,945

[22] Filed: May 30, 1989

[51] Int. Cl.[5] ........................ B01F 11/00; F16H 33/00

[52] U.S. Cl. .......................................... 366/128; 74/87; 310/81; 366/123

[58] Field of Search ........ 366/108, 116, 117, 120–123, 366/128; 74/87; 310/81

[56] References Cited

U.S. PATENT DOCUMENTS

| | | | |
|---|---|---|---|
| 2,198,148 | 4/1940 | Baily | 366/128 |
| 2,967,048 | 1/1961 | Fontaine | 366/123 |
| 4,199,264 | 4/1980 | Uebel | 366/123 |
| 4,435,083 | 3/1984 | Matson | 366/114 |
| 4,526,049 | 7/1985 | Pottgens | 74/87 |
| 4,590,814 | 5/1986 | Wadensten | 310/81 |
| 4,752,137 | 6/1988 | Moren | 366/120 |

FOREIGN PATENT DOCUMENTS

| | | | |
|---|---|---|---|
| 1297928 | 6/1969 | Fed. Rep. of Germany . | |
| 7413005 | 4/1975 | Netherlands | 366/128 |

OTHER PUBLICATIONS

A textbook "Mechanisms", in Russian, Mashinostroyenie, publishers, Moscow, 1976, pp. 668 and 669.

*Primary Examiner*—Timothy F. Simone
*Attorney, Agent, or Firm*—Fleit, Jacobson, Cohn, Price, Holman & Stern

[57] ABSTRACT

An unbalance vibrator comprises a drive shaft mounting unbalance weights, one of which is fixed stationary while the other one is turnable with respect to the drive shaft, and a mechanism for adjusting their mutual position made in the form of a rod spring-loaded in an axial direction and fitted in the movable unbalance weight so as to be movable radially, and adapted to interact with the other unbalance weight. The fixed unbalance weight is made in the form of a cylindrical sleeve having radial holes provided on its inside cylindrical surface. The movable unbalance weight is made in the form of at least a part of a cylinder arranged inside the cylinder, the rod being mounted so as to be engageable in one of the radial holes provided on the inside cylindrical surface of the sleeve.

10 Claims, 3 Drawing Sheets

UNBALANCE VIBRATOR

TECHNICAL FIELD

The present invention relates generally to vibration engineering and, more specifically, to the unbalance vibrator for vibratory devices.

The invention may be used to best advantage for a number of applications which include vibrostabilizing treatment of components machined by press-working or cutting as well as by welding or casting for the purpose of stabilizing their geometric dimensions and shape or reducing residual stresses; vibration loading for testing the effect of vibrational overloads on the operational reliability and vibration-resistance, for example, of aircraft.

The present invention can also be employed in other fields such as vibroabrasive treatment of components, for example, in deburring or descaling machines, construction materials industry (e.g., concrete compaction machines or pile driving machines), highway engineering (e.g., asphalt or gravel compaction machines), as well as transportation devices, such as vibratory feeding or conveying appartus.

BACKGROUND OF THE INVENTION

At the present time, the problem of extending the processing capacities of vibratory equipment under development is very urgent since it allows reductions in the component machining time and, consequently, in power consumption, which leads to increased productivity per unit time and improved quality of vibration treatment. Unbalance vibrators used most commonly for the generation of disturbing forces are of the mechanical inertia unbalance type which offers simplicity in operation and fairly high disturbing forces. Under operating conditions, a necessity may often arise for the amount of disturbing force generated by the vibratory device to be adjusted over a wide range, for example, in order to adjust the oscillation amplitude in the vibratory device.

The amount of vibrational force generated is directly proportional to the mass of unbalance weight, which is arranged eccentrically with respect to the axis of rotation of the drive shaft, the distance of the centre of this mass from the axis of rotation of the drive shaft, and to the squared frequency of rotation (angular velocity) of the drive shaft.

By virtue of the fact that varying the frequency of rotation of the drive shaft over a wide range necessitates the use of a d.c. motor in conjunction with a supply voltage regulator, the simplest ways of varying the amount of the disturbing force would be either by changing the eccentric mass of the unbalance vibrator or by altering the distance from the centre of its masses to the axis of rotation of the drive shaft.

Known in the present state if the art is an unbalance vibrator comprising a drive shaft which is rotatably mounted in the housing and carries a balanced disk fixed stationary on the shaft and having holes adapted to receive one or several rods to provide for adjustment of the eccentric mass (cf., e.g., a textbook "Mechanisms", in Russian, "Mashinostroyenie" Publishers, Moscow, 1976, p. 669, FIG. 11.4). Such an unbalance vibrator is too complicated in manufacture because of the need to provide reliable clamping of the movable rods in conjunction with their rapid replacement required for changing the amount of the eccentric mass.

Another unbalance vibrator known presently comprises a drive shaft carrying an unbalance weight fixed stationary on the shaft and another unbalance weight which is movable in a circular direction and can be fixed in position on the shaft by means of a key joint and offers a plurality of key slots determining the number of its positions relative to the fixed unbalance weight (cf., e.g., a texbook "Mechanisms", in Russian, "Mashinostroyenie" Publishers, Moscow, 1976, p. 668, FIG. 11.3, b). Turning the movable unbalance weight with respect to the fixed unbalance weight causes displacement of their common mass centre relative to the axis of rotation of the drive shaft and, consequently, a change in the amount of vibrational force which the vibratory device will produce.

A common disadvantage of both of the aforedescribed unbalance vibrators resides in the fact that the produced vibrational force can only be varied within a comparatively narrow range, which restricts the field of application of unbalance vibrators of these types.

The closest to the herein proposed invention is a centrifugal unbalance vibrator (DE, C, 1,297,928) comprising a fixed shaft fitted in a rotary electric motor. Fixed stationary on the housing of the electric motor is an unbalance weight made in the form of an arc-shaped guide supporting another movable unbalance weight made in the form of an arc-shaped element. The unbalance weights are provided with a mechanism for adjusting their mutual position and fashioned as a pin retainer spring-loaded in a radial direction. One end of the retainer projects over the fixed unbalance weight while the other end engages in and is movable within a blind radial hole passing through the fixed unbalance weight and the motor housing. The projecting end of the pin retainer is engageable in one of the through radial holes provided in the movable unbalance weight dependent on the amount of static moment which can be varied by displacing the centre of masses of the movable and the fixed unbalance weights effected through circular movement of the movable unbalance weight. The amount of static moment of the unbalance weights is proportional to the amount of the disturbing force produced. For adjusting the disturbing force, a cylindrical pin or screwdriver is fitted in the hole interacting with the rod end by means of which the retainer end is held in the radial hole, while the unbalance weight is moved to another position corresponding to the angle between two adjacent holes, so that the retainer should engage in one of the adjacent holes in the movable unbalance weight, from which hole it can be disengaged using said pin or screwdriver.

A substantial disadvantage of the prior-art unbalance vibrator mentioned above resides in the fact that the mechanism for adjusting the mutual position of the unbalance weights does not allow the disturbing force to be varied over a wide range, which prevents vibration treatment of a wide range of products. Another disadvantage of the prior-art unbalance vibrator lies with the sophisticated adjustment of the disturbing force, since the adjustment process involves the use of an additional tool such a cylindrical pin or rod, which has to be fitted, in succession, in each of the through holes passing underneath the movable retainer, thus increasing the total adjustment time.

Furthermore, the unbalance vibrator discussed above features a comparatively high drag coefficient because of the clearance between the movable unbalance weight and the motor housing, which increases noise during operation of the unbalance vibrator.

SUMMARY OF THE INVENTION

It is therefore an object of the present invention to extend the processing capacities of the unbalance vibrator.

It is also an object of this invention to simplify the adjustment of the amount of the disturbing force and to reduce the adjustment time.

It is another object of this invention to reduce noise caused by the operation of the unbalance vibrator.

With the foregoing and other objects in view the present invention thus resides in the fact that in an unbalance vibrator comprising a drive shaft mounting unbalance weights one of which is fixed stationary while the other one is turnable with respect to the shaft, and a mechanism for adjusting their mutual position made in the form of a rod spring-loaded in an axial direction and fitted in one of the unbalance weights so as to be movable radially and adapted to interact with the other unbalance weight, according to the invention, one of the unbalance weights is made in the form of a cylindrical sleeve having radial holes provided on its inside cylindrical surface, whereas the other unbalance weight is made in the form of at least a part of a cylinder which is arranged in the sleeve and adapted to mount a rod engageable in one of the radial holes provided in the sleeve.

The herein proposed construction of the unbalance weights makes it possible to increase the number of holes adapted to receive the radially movable rod, thus extending the adjustment range of the static moment which can be varied from zero to its greatest. A streamline shape given to the unbalance weights abates noise produced by the unbalance vibrator during operation owing to reduced drag of each of the unbalance weights.

According to the preferred embodiment of the present invention, the adjusting mechanism comprises an additional rod spring-loaded in a radial direction and mounted on the inner unbalance weight.

Provision of an additional rod in the unbalance weight of the unbalance vibrator, in combination with the main rod, makes it possible to reduce diameter of the holes adapted to receive both of the rods, thus increasing the number of holes provided in the cylindrical sleeve of preset dimensions, which extends the adjustment range of the disturbing force and, consequently, the processing capacities of the unbalance vibrator.

According to another embodiment of the invention, each of the rods is provided with a projection, while the outside end face of the inner unbalance weight is provided with radial slots adapted to receive the projections of the rods, the radial holes provided in the cylinder being, in fact, blind holes.

Provision of a projection engageable in the radial slot provided on the outside surface of the unbalance of the unbalance weight makes it possible to simplify disengagement of the retainer from its mating hole in the cylinder, thus decreasing the time required for adjusting a desired amount of vibrational force of the unbalance vibrator and facilitating its attendance.

Provision of blind holes in the unbalance weight made in the form of the cylindrical sleeve makes it possible to substantially reduce the level of noise produced by the unbalance vibrator in the course of its operation due to reduced drag of the cylindrical sleeve casing and, consequently, to improve the operating conditions for the attending personnel.

According to still another embodiment of the invention, the rods are disposed diametrically opposite to each other so that the centre of mass of the inner unbalance weight is arranged on a line coinciding with the axes of the rods.

Such an arrangement of the rods facilitates their being disengaged from the mating holes by means of bringing them closer to each other, which reduces the adjustment time and facilitates the attendance of the unbalance vibrator.

Arrangement of the rods on a line coinciding with the centre of mass of the inner unbalance weight improves retention reliability since the direction of movement of the rods will coincide, in this case, with the action vector of the centrifugal force produced by the inner unbalance weight.

According to yet another embodiment of the invention, the radial holes provided on the inside cylindrical surface of the cylindrical sleeve are made in the form of spline grooves.

Provision of the radial holes made in the form of spline grooves enables them to be readily cut, for example, by a milling cutter, which facilitates the unbalance vibrator manufacturing process.

BRIEF DESCRIPTION OF THE DRAWINGS

In what follows the present invention will now be disclosed in a detailed description of an illustrative embodiment thereof with reference to the accompanying drawings, wherein.

BRIEF DESCRIPTION OF PREFERRED EMBODIMENTS

Figure 1:
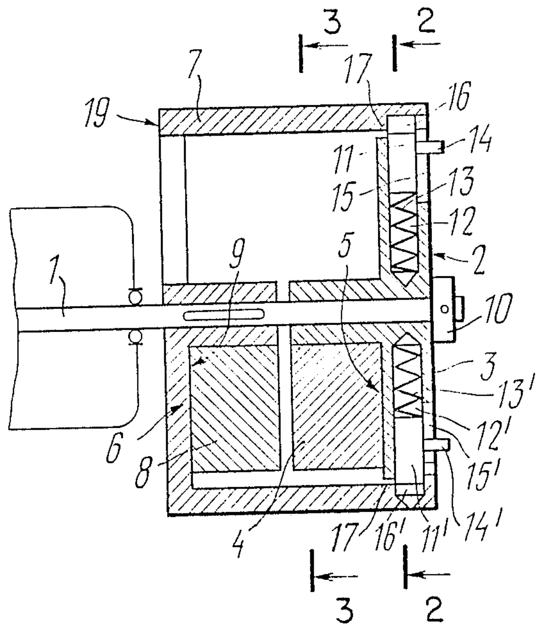
FIG. 1 is a general longitudinal sectional view of an unbalance vibrator, according to the invention.
Figure 2:
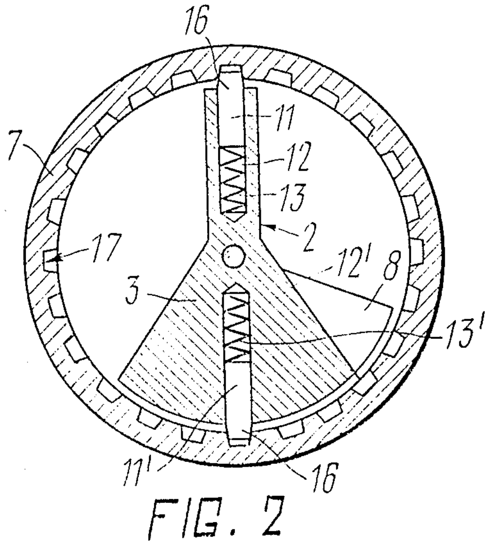
FIGS. 2, 3 are sectional views taken on the line II—II in FIG. 1 with reference to different embodiments of the inner unbalance weight.
Figure 4:
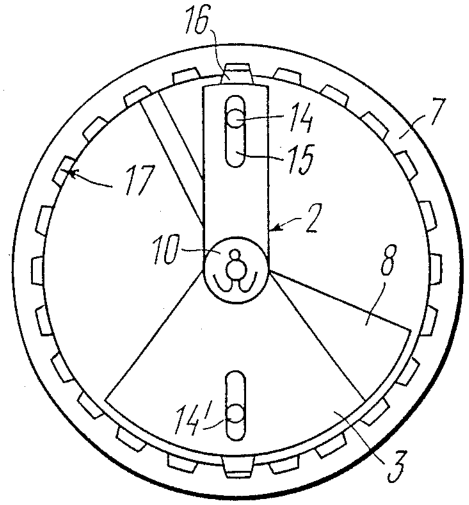
FIG. 4 is a view as seen facing an arrow A in FIG. 1.

An unbalance vibrator comprises a rotatable drive shaft 1 (FIGS. 1, 2, 4) which carries a unbalance weight 2 which is turnable with respect to the shaft and is made in the form of at least a part of a cylinder 3 having an unbalance bob 4 secured on its inside face 5. The unbalance weight 2 is coaxially arranged within an unbalance weight 6 fixed stationary on the shaft 1 and made in the form of a cylindrical sleeve 7 having an unbalance bob 8 secured on an inside face 9. The unbalance weight 2 is secured on the drive shaft 1 by means of a flange 10. The unbalance vibrator is provided with a mechanism for adjusting the mutual position of the unbalance weights 2, 6 which mechanism is made in the form of two cylindrical rods, a main rod 11 and an additional rod 11' fitted in two diametrically opposite radial cylindrical holes 12, 12' of the unbalance weight 2. The centre of mass of the unbalance weight 2 is arranged on the line coinciding with the axes of the rods 11, 11'. The rods 11, 11' are loaded, in a radial direction, by means of elastic elements such as, for example, cylindrical spiral compression springs 13, 13', and provided with projections 14, 14'. The axis of symmetry of each of the projections 14, 14' is square to the axis of symmetry of each of the rods 11, 11', and the projections 14, 14' pass through the radial slots 15 provided diametrically opposite, on the outside end face of the inner movable weight 2. Ends 16, 16' of the rods 11, 11' extending from the holes 12, 12', engage in radial blind spline slots 17 provided on the inside cylindrical surface of the sleeve 7.

The unbalance vibrator operates as follows.

In the initial position, the ends 16, 16' of the rods 11, 11' extending from the holes 12, 12' of the inner unbalance weight 2, engage in the spline slots 17 of the sleeve 7 so as to form a detachable joint. The disturbing force generated with the operation of the electric motor (not shown) is transmitted, via the unbalance weights 2 and 6, to the drive shaft 1 and to the motor housing, the amount of the disturbing force being dependent on the angle of turn between the mutual positions of the unbalance weights 2, 6. For adjusting the amount of the disturbing force, the electric motor is to be turned off whereby the unbalance vibrator is stopped, and the cylindrical rods 11, 11' have to be moved, using the projections 14, 14', in a radial direction against tension of the springs 13, 13', until the rods 11, 11' should disengage from the spline slots 17 so that the inner unbalance weight 2 can be freely turned with respect to the drive shaft 1 and the outer unbalance weight 6. While holding the rod projections 14, 14' in a position when the springs 13, 13' are compressed the unbalance weight 2 is turned, relative to the unbalance weight 6, through an angle corresponding to a required amount of the static moment, whereupon the projections 14, 14' of the rods 11, 11' are gradually released so as to allow their free ends 16, 16', which are moved under tension of the springs 13, 13', to engage in two diametrically opposite spline slots 17 provided on the inside cylindrical surface of the sleeve 7. Next, the drive motor is started to continue treatment.

Figure 3:
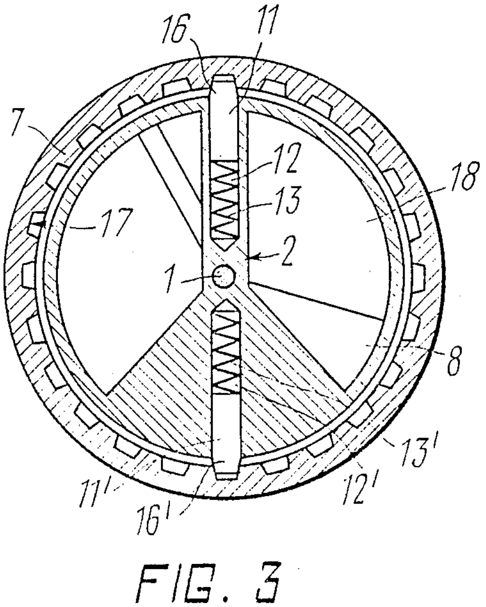

According to another embodiment of the invention, the inner unbalance weight 2 is made in the form of a cylindrical insert whose inside surface is provided with sector-shaped recesses 18 (FIG. 3).

Figure 5:
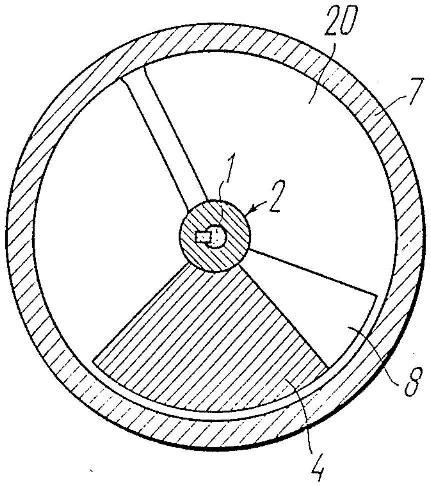
FIGS. 5, 6 are sectional views taken on the line V—V in FIG. 1 with reference to different embodiments of the inner unbalance weight.

For increasing the distance from the axis of rotation of the drive shaft 1 to the centre of mass of the outer unbalance weight 6, its end face wall 19 (FIG. 1) may be provided with sector-shaped recesses 20 (FIG. 5).

Figure 6:
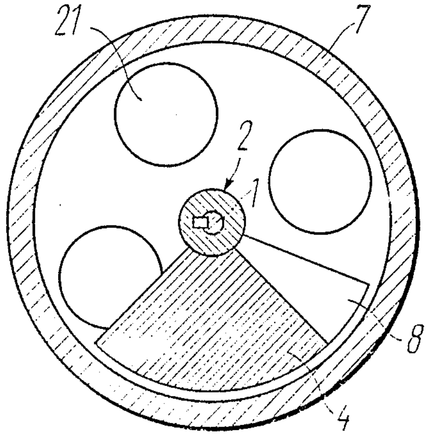

According to still another embodiment of the outer unbalance weight 6, its end face wall 19 (FIG. 1) is provided with cylindrical recesses 21 (FIG. 6).

We claim:

1. An unbalance vibrator comprising: a rotary drive shaft;

an unbalance weight fixed stationary and another unbalance weight turnable with respect to said rotatable drive shaft;

one of said unbalance weights being made, at least in part, in the form of a cylindrical sleeve having radial holes provided on an inside cylindrical surface of the sleeve;

the other of said unbalance weights being made in the form of at least a part of a cylinder arranged within said sleeve; and a mechanism for adjusting the mutual positions of said unbalance weights and made in the form of a rod spring-loaded in an axial direction and mounted on said turnable unbalance weight so as to move radially to engage in one of said radial holes provided in said sleeve.

2. An unbalance vibrator as claimed in claim 1 wherein the radial holes provided on the inside cylindrical surface of the sleeve are made in the form of spline grooves.

3. The unbalance vibrator as claimed in claim 1 wherein the radial holes in the cylindrical sleeve extend about the entire inside cylindrical surface of the sleeve for adjustment of the turnable unbalance weight.

4. The unbalance vibrator as claimed in claim 1 wherein the rod is provided with a projection which extends through an outside wall of the turnable unbalance weight so as to be readily accessible for adjustment of the turntable unbalance weight.

5. The unbalance vibrator as claimed in claim 1 wherein the unbalance weights are coaxially arranged on the rotatable drive shaft for rotation with the shaft.

6. The unbalance vibrator as claimed in claim 1 wherein both of the unbalance weights are disposed inside the cylindrical sleeve.

7. The unbalance vibrator as claimed in claim 6 wherein:

the radial holes in the cylindrical sleeve extend about the entire inside cylindrical surface of the sleeve for adjustment of the turnable unbalance weight;

the rod is provided with a projection wich extends through an outside wall of the turnable unbalance weight so as to be readily accessible for adjustment of the turnable unbalance weight; and the unbalance weights are coaxially arranged on the rotatable drive shaft for rotation with the shaft.

8. An unbalance vibrator comprising:

a drive shaft;

an unbalance weight fixed stationary and another unbalance weight turnable with respect to said drive shaft;

one of said unbalance weights being made, at least in part, in the form of a cylindrical sleeve having radial holes provided on an inside cylindrical surface of the sleeve;

the other of said unbalance weights being made in the form of at least a part of a cylinder arranged within said sleeve; and a mechanism for adjusting the mutual positions of said unbalance weights and made in the form of a rod spring-loaded in an axial direction and mounted on said turnable unbalance weight so as to move radially to engage in one of said radial holes provided in said sleeve, the adjusting mechanism comprising an additional rod spring-loaded in a radial direction and mounted on the inner unbalance weight.

9. The unbalance vibrator as claimed in claim 8 wherein each of the rods is provided with a projection, while the outside end face of the inner unbalance weight is provided with radial slots adapted to receive the rod projections, the radial holes provided in the cylindrical sleeve being blind holes.

10. The unbalance vibrator as claimed in claim 9 wherein the rods are arranged diametrically opposite so that the center of mass of the inner unbalance weight is arranged on a line coinciding with the axes of the rods.

* * * * *